United States Patent
Janke

(10) Patent No.: US 8,342,130 B2
(45) Date of Patent: Jan. 1, 2013

(54) APPARATUS FOR THE CULTIVATION OF SHELLFISH

(75) Inventor: Achim Ralph Janke, Nelson (NZ)

(73) Assignee: TOPS Oysters Limited, Nelson (NZ)

( * ) Notice: Subject to any disclaimer, the term of this patent is extended or adjusted under 35 U.S.C. 154(b) by 43 days.

(21) Appl. No.: 12/864,182

(22) PCT Filed: Jan. 16, 2009

(86) PCT No.: PCT/NZ2009/000007
§ 371 (c)(1),
(2), (4) Date: Jul. 22, 2010

(87) PCT Pub. No.: WO2009/128729
PCT Pub. Date: Oct. 22, 2009

(65) Prior Publication Data
US 2010/0294203 A1 Nov. 25, 2010

(30) Foreign Application Priority Data
Jan. 22, 2008 (NZ) ........................ 565350

(51) Int. Cl.
*A01K 61/00* (2006.01)
(52) U.S. Cl. ...................................... 119/234
(58) Field of Classification Search .................. 119/209, 119/223, 234, 236, 238, 239, 200, 240, 241
See application file for complete search history.

(56) References Cited

U.S. PATENT DOCUMENTS

| | | | | |
|---|---|---|---|---|
| 3,572,292 A * | 3/1971 | Quayle et al. | ................ | 119/238 |
| 4,594,965 A * | 6/1986 | Asher et al. | ................ | 119/239 |
| 4,788,937 A * | 12/1988 | Keyser | ................ | 119/238 |
| 5,579,724 A | 12/1996 | Chauvin | | |
| 6,050,225 A * | 4/2000 | Stamps | ................ | 119/859 |
| 6,520,116 B1 * | 2/2003 | Jefferds | ................ | 119/238 |
| 6,578,523 B2 * | 6/2003 | Gagnon | ................ | 119/234 |

FOREIGN PATENT DOCUMENTS

| | | |
|---|---|---|
| FR | 2858920 | 2/2005 |
| GB | 2061081 A | 5/1981 |
| GB | 2421884 A | 12/2006 |
| NZ | 511126 | 8/2001 |
| NZ | 531711 | 6/2004 |

OTHER PUBLICATIONS

Patent Cooperation Treaty (PCT) Written Opinion of the International Searching Authority and International Search Report for PCT Application No. PCT/NZ2009/000007, dated May 8, 2009.

* cited by examiner

*Primary Examiner* — Rob Swiatek
*Assistant Examiner* — Lisa Tsang
(74) *Attorney, Agent, or Firm* — Wolfe, Sadler, Breen, Morasch & Colby, LLC

(57) ABSTRACT

An apparatus for the cultivation of shellfish, the apparatus including a base with a culture surface and a support attachment for the base, the apparatus characterized in that the support attachment is configured to permit rotational movement of the base relative to a support when the base is secured to the support.

28 Claims, 6 Drawing Sheets

APPARATUS FOR THE CULTIVATION OF SHELLFISH

CROSS-REFERENCE TO RELATED APPLICATION

The present invention claims priority under 35 U.S.C. §119 to New Zealand Patent Application No. 565350 as filed on Jan. 22, 2008. The present invention also claims priority under 35 U.S.C. §371 to Patent Cooperation Treaty (PCT) Application No. PCT/NZ2009/000007 as filed on Jan. 16, 2009.

TECHNICAL FIELD

The present invention relates to a method and apparatus for aquaculture. The invention has particular application to the cultivation and harvesting of shellfish.

BACKGROUND ART

Shellfish such as oysters and mussels are a highly regarded seafood, both in New Zealand and overseas. The shellfish industry is worth many millions of dollars to the New Zealand economy, and considerable resources and effort goes into the cultivation of shellfish. Oysters in particular, are a particularly valuable crop.

It can be uneconomic to collect shellfish from their natural environment. This is due to the accessibility of their breeding and living environments, as well as varying abundance site to site. Labour costs and time can also be a factor in not being able to harvest from their natural environment.

Overfishing of shellfish in their natural environment is also a concern. Consumers are becoming more aware of the impact of unsustainable harvesting of seafood, and choosing to purchase food which has been harvested in a sustainable manner.

For this reason, a number of marine and freshwater farms are devoted to the cultivation of shellfish, using a number of different methods.

One such method is disclosed in New Zealand Patent No. 511126, which describes a platform which is installed over the seabed. The platform retains shellfish blocks which provides surfaces on which the shellfish grow. The platform, while allowing cultivation of a large number of shell fish, presents a number of issues in its use.

The platform must be placed upon the seabed, and the shellfish blocks transported and installed into the platform. This can require a number of divers with SCUBA gear if the platform is established in relatively deep water. The labour required to facilitate establishment of the platform can be intensive. When harvesting the mature shellfish, the blocks must be removed, and each shellfish individually harvested from the block. Again, this is a labour intensive process.

Also, being relatively fixed in place, the shellfish can, at times, be exposed to sediments and detritus being carried on the prevailing current. This can foul shellfish, and places stress on the shellfish when feeding.

Over time, the platform and its shellfish blocks steadily collects sediment which harbours parasites such as mud worms or flatworms. These can cause disease and parasite infestation of shellfish colonies, ultimately affecting the quality of the shellfish flesh.

Another source of stress for shellfish is overcrowding. The platform method of cultivating shellfish does not allow the shellfish farmer control of the distribution of the shellfish within the platform. Instead there can be uneven distribution of shellfish within the platform, so portions of the platform are densely populated by shellfish.

Shellfish in close proximity to each other, as with most organisms, will compete for natural resources in their environment, particularly food. As shellfish are relatively sedentary once established, they are not necessarily able to remove themselves to a better environment. Therefore it can be appreciated that platform cultivation of shellfish can be a stressful method for raising shellfish, with a detrimental effect on the flesh of the shellfish.

Variations of the platform method of cultivating oysters have been implemented, for example using fixed inter-tidal trays and racks or mesh bags. However, these all have the same problems as the system disclosed in New Zealand Patent No. 511126.

To resolve this, growers have developed growth systems which encourage the cultivation of individual shellfish. A typical example is U.S. Pat. No. 5,579,724, which discloses a holder for an oyster. However, these systems are not ideal.

The oyster holder disclosed by U.S. Pat. No. 5,579,724 is a relatively complex shape and configuration to manufacture. This adds significantly to the costs of manufacture of the holder.

The holder is also designed in such a way that the juvenile oyster spat must be precisely placed for optimum growth of the oyster. This can be time consuming process when commencing the cultivation process.

The configuration of the holder disclosed in U.S. Pat. No. 5,579,724 is such that a build up of sediment, and thus the problems associated with such a build up of sediment as previously discussed above, can occur in the early stages of the oyster's growth.

The holder as disclosed in U.S. Pat. No. 5,579,724 is not specifically manufactured with a mounting means to secure the holder to a growth surface. Instead, a portion of the holder is meant to be bonded to a growing surface in the environment in which the oyster is to be cultivated. Again, this is a time consuming process when commencing the cultivation process.

One method of shellfish cultivation used to address the problems of seabed cultivation of shellfish as exemplified in New Zealand patent No. 511126 is to suspend the cultivated shellfish in the water column via a weighted rope or similar filamentary growth medium. Usually, the rope is anchored or otherwise weighted to the seabed, and the upper portion of the rope is attached to a buoy. This method of aquaculture requires less labour to install and remove the shellfish growth medium. It also reduces the exposure of shellfish to sedimentation and parasites.

A number of apparatus has been developed to utilise this method of cultivating shellfish, such as United Kingdom Patent Application No. 2421884, which is typical of apparatus used in this method of cultivating shellfish. This patent application discloses C-shaped pegs with the ends of the C-peg being forced through a rope. The peg provides surface area on which mussels can anchor themselves using their byssus, which is a sticky threadlike secretion from mussels.

However, although placed in the water column, shellfish being cultivated in this manner can still be exposed to drifting sediment and detritus.

The optimum orientation of shellfish when feeding, is such that when feeding, the open portion of the shellfish is facing downstream of the prevailing current. This reduces particles entering the feeding organs of the shellfish, and also permits easier egress of any oversized particles which enters the feeding organs of the shellfish.

The apparatus disclosed in GB 2421884 does not permit the shellfish to re-orientate itself once it has been established on the peg. Furthermore, there is no control over the distribution of shellfish cultivated on this or similar shellfish aquaculture apparatus. Thus, there is the potential for overcrowding and competitive stress with a resulting detrimental effect on the size and flesh of the shellfish raised in this manner.

Another further disadvantage of this shellfish cultivation apparatus, is that when harvesting the mature shellfish, considerable time and labour is required to remove the collected shellfish from the growth surfaces of the peg.

Another example of apparatus for cultivating shellfish in the water column is United Kingdom Patent Application 2061081. This patent application discloses a mounting device for a shellfish to be used with plastic tape suspended in the water column.

As with U.S. Pat. No. 5,579,724, the mounting device disclosed in this UK application is particularly problematic as it is a relatively complex shape and configuration to manufacture.

When securing the shellfish to the mount, there is little constraint on the adhesive, and therefore there can be spillage of the adhesive onto regions of the shell of the shellfish where the adhesive is not desired. This is a particular concern where adhesive has spilled onto the region of the shellfish where the shell halves meet.

Once the shellfish is secured to the mount, the mount in turn fixed to the tape. This requires time consuming manipulation of the mount in order to secure the mount to the tape adequately.

The tape itself must also be precisely constructed with apertures complementary to the mount, adding to the expense of manufacture.

Although the plastic tape used in this method of cultivating shellfish is durable and long lasting, it is this particular characteristic which also presents particular environmental problems when harvesting the mature shellfish. As the shellfish is collected, the tape and its mount, designed specifically for one time use, is simply discarded, creating considerable waste.

Portions of both the tape and mount may be damaged or broken away during harvesting, and these portions become flotsam in the marine environment.

Another facet of shellfish cultivation which is not adequately addressed by the prior art is the tagging or identification of the shellfish. It is desirable to have the ability to mark cultivated shellfish in some way to allow the shellfish to be traced in the event of a product recall.

Shellfish is a food which can easily become contaminated. It is a matter of public safety to be able to identify and recall shellfish which is at risk of contaminating the general public if consumed.

Marking of shellfish product can also be used as a promotional aid, to inform the consumer of the origin of the shellfish. This would be particularly important for regions which have a reputation for high quality seafood such as oysters coming from Bluff, New Zealand.

Current systems for labelling of shellfish are limited. For example, New Zealand Patent No. 531711 provides a tag which becomes incorporated into the shell portion of the shellfish as it matures.

This particular method of marking is limited to electronic identification, as the surface area of the tag does not permit the application of lettering or similar markings. In any event, the tag becomes partially integrated with the shell, and may become difficult to read.

Any lettering or other markings on the tag becomes fouled over time, thus becoming illegible. Considerable cleanup is required in order to make the markings readable.

This is particularly the case with the oyster holder disclosed in U.S. Pat. No. 5,579,724, discussed earlier in this specification. The holder is provided with a small, flat surface on one side of the holder on which markings can be applied. However, dirt and organisms such as algae can foul this area, making the markings illegible. Careful cleaning is required to make the markings readable, but without destroying the markings during the cleaning process.

If the tag is a RFID tag, electronic equipment is required to read the information stored on the tag.

Other methods of labelling, such as adhesive labels, require that the shellfish be sufficiently dry for the adhesive to become securely fastened to the shellfish. This would be extremely labour and time intensive to achieve, and would add substantially to the harvesting cost of the shellfish, a cost which would then have to passed onto the consumer.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention, there is provided an apparatus for the cultivation of shellfish, the apparatus including:
 a base with a culture surface, and
 a support attachment for the base
the apparatus characterised in that
the culture surface is configured to support a single shellfish.

According to another aspect of the present invention, there is provided an apparatus for the cultivation of shellfish, the apparatus including:
 a base with a culture surface, and
 a support attachment for the base
the apparatus characterised in that
the support attachment is configured to permit rotational movement of the base relative to the support when the base is secured to the support.

According to another aspect of the present invention, there is provided a method of cultivating shellfish, the method including the steps of:
a) securing a shellfish spat to a base;
b) securing the base to a support;
the method characterised by the additional step of:
c) securing the base to the support such that the base rotates relative to the support.

According to another aspect of the present invention, there is provided a method of marking shellfish, the method including the steps of:
a) securing a shellfish spat to the base;
b) securing the base to a support;
c) immersing the support in water until the shellfish spat grows to maturity the method characterised by the additional step of:
d) marking the base to indicate information relating to the shellfish.

According to yet another aspect of the present invention there is provided an apparatus for marking shellfish, the apparatus including:
a base with a culture surface for cultivation of shellfish, and
a support attachment for the base,
the apparatus characterised in that
the base includes markings to indicate information relating to the shellfish.

The shellfish may be any economically valuable bivalve. Bivalves are the group of animals which have two part shells, and are symmetrical along their hinge line. For example, the shellfish may be clams, pipi, or mussels.

Preferably the shellfish are oysters, and shall be referred to as such through the remainder of this specification, although some embodiments of the present invention may also be used with scallops.

The term "spat" refers to a juvenile bivalve, which has yet to reach maturity.

The base may be any apparatus which is configured to receive at least a portion of the oyster. For example, the base may be a rock, stone, or length of metal or plastic. Preferably, the base is a disc, and shall be referred to as such throughout the remainder of this specification.

The disc may be made from metal, rubber, or ceramic, but preferably is moulded from plastics material, such as polyvinyl chloride (PVC) or polyethylene using conventional injection moulding techniques to minimise the cost of fabrication of the disc.

Alternatively, the disc may be moulded using conventional rotational moulding techniques. UV stable plastics material is preferred as at times the disc may be exposed to sunlight, even in the water column. Persons skilled in the art will appreciate that other plastic materials may be used as desired.

Plastics material is preferred for its durable and robust properties. In the course of harvesting and transporting the oysters, the base will receive knocks and bumps, so durability is a desired characteristic for the disc. Plastic is also stable in a marine environment and maintains its structural integrity.

Preferably, the disc is of a size which will accommodate only a single oyster spat. Persons skilled in the art will appreciate that the disc may be bigger to allow more than one oyster to cultivated on a single disc, however, this may expose the oyster to overcrowding and competition stress.

Preferably, the disc is concave on one side of the disc to form a recess and flat on the opposing side. The area of the concave or recessed surface of the disc forms the culture surface and is sufficient for an oyster spat to be placed upon.

It should be understood that in some embodiments of the present invention the culture surface may be defined by a lip or protrusion arising from the circumference of one side of the disc.

In some embodiments of the present invention, the lip or protrusion defining the perimeter of the culture surface may be provided with apertures, slots or other discontinuities in their sides. This provides access through the sides of the disc to the culture surface.

A concave cross-section is preferred as it provides a recess for the complementary profiled shell of the oyster spat. This provides greater support and surface area for the growing oyster, does not hinder growth and assists if the apparatus is later used for display purposes.

The smooth curved surface also makes it easier to orientate the spat when securing the spat to the culture surface using adhesive.

The apertures, slots or other discontinuities provided in the sides of the lip or protrusion of the disc may assist in the application of adhesive to the culture surface.

A concave cross-section also ensures that there is little wastage of adhesive, by collecting in the centre of the recess. When the oyster spat is placed within the recess, the adhesive will spread to the periphery of the concave base, assisting in providing a tight bond for the oyster spat to the base.

Persons skilled in the art will appreciate that the disc may be any shape, circular, oval or hexagonal or otherwise, so long as there is a recess which is complementary to the shell of the oyster spat. The preferred embodiment of the present invention is for the disc to be circular.

In some embodiments of the present invention, a sponge like medium may be placed between the oyster and the culture surface of the disc. This sponge like medium may be rubber or fabric mesh weave to assist in the securing of the oyster spat to the recess of the disc. Persons skilled in the art that other materials are envisaged for this purpose, such as cork and the like.

The support attachment for the base may be any portion of the base configured to be secured to a support. For example, the support attachment may be a clip or snap lock fitting. Preferably, the support attachment is a pin arising from the flat side of the base.

Preferably, the pin is configured to penetrate the weave of a culture rope, but persons skilled in the art will appreciate that the pin may be configured to be secured to other support apparatus. Examples of such support apparatus include a frame, or the struts of a jetty or pier.

Preferably, the pin is circular in cross-section. This configuration is preferred as it reduces friction where the pin is in contact with the culture rope and allows ready rotation of the base relative to the culture rope.

In some embodiments of the present invention, the portion of the pin where it meets the base may have a reduced diameter relative to the rest of the pin. This assists in the removal of the base from the pin when the mature oyster is harvested.

Preferably the pin is configured with a conical barbed point. This aids in the penetration of the weave of the culture rope, and maintains the base (and its attached oyster) in proximity to the culture rope.

In some embodiments of the present invention, the pin may be configured without a barb. After the pin has been inserted through the culture rope, the tip of the pin may be heat treated to form a barb to retain the base to the culture rope.

Preferably the culture rope is fabricated from hard wearing material such as nylon or plastics material.

In some embodiments of the present invention, negative buoyancy of the culture rope is ensured using a plastic coated lead core running through the centre of the culture rope. The weight of the suspended rope helps close the weave of the culture rope once the barb has passed the culture rope.

The culture rope may be treated with an anti-fouling agent to reduce or prevent fouling of the culture rope surface. For example, a hot wax may be applied to the culture rope and the base. Alternatively, organic anti-fouling agents may be incorporated into the plastics material during its extrusion, or sprayed onto the culture rope and the base.

The culture rope may be arranged vertically in the water column. In some embodiments of the present invention, the culture rope may be stretched horizontally between two mounting points, such as buoys.

In some embodiments of the present invention, the culture rope may be arranged within a frame suspended in the water column, with the culture rope looping back and forth between the upper and lower portion of the frame.

An advantage of the present invention is that the attachment means allows the oyster to re-orientate itself such that the hinge of the oyster faces the water surface, while the feeding organs face the sea bed. This means that regardless of the position of the disc when first affixed to the culture rope, once the frame is immersed in water, the oyster will orientate itself to an optimal position.

Allowing the oyster to re-orientate itself is possible due to the relatively loose fit of the base to the culture rope. Prior art systems lock the cultivation surface for shellfish in place such that movement of the cultivation surface is not permitted. Thus, shellfish are permanently fixed in place once placed onto a cultivation surface.

Preferably, the flat side of the disc may be used as a surface for carry markings indicating information pertaining to the origin of the oyster.

Examples of such information may include the location in which the particular oyster was cultivated. The markings may also show the name of the cultivator and their farm, and the frame number (if the oyster was cultivated on a culture rope suspended in a frame).

In some embodiments of the present invention, the markings may also give reference to a website specific to the farmer or grower. This gives farmers the opportunity to provide additional information about the cultivated oyster.

For example, the website may discuss growing conditions, dates of seeding (installation of the oyster spat onto the culture rope), dates of harvesting, food safety, or other aspects of quality assurance which may be important for the marketing of the oyster. The website may also include maps, photographs or other visual aids to show the area in which the oyster was cultivated.

In some embodiments of the present invention, the markings include a reference number which may be entered into the website by the consumer to retrieve information, such as dates of seeding or harvesting, specific to the oyster or oysters being consumed.

It should be appreciated that by associating markings with individual oyster spats allows traceability of the adult oyster back to its juvenile stage.

The markings may be adhesive stickers or labels which have been applied to the disc before their immersion in water.

In some embodiments of the present invention, the disc may be moulded from plastics material, the markings being moulded in situ.

In preferred embodiments of the present invention, the disc itself may be directly printed upon with the relevant information prior to placement of the oyster spat. Alternatively, the markings may also be applied using engraving or branding means.

In some embodiments of the present invention, the disc may be manufactured from transparent or translucent plastics material. In this embodiment the markings may be applied to the culture surface, with the markings face down such that they are read by viewing the reverse side of the disc.

Placing the markings on the culture surface provides protection for the markings from any damage from fouling agents or mechanical processes, ensuring their long term legibility when viewed from the reverse side of the disc.

Persons skilled in the art will appreciate that markings may be placed around the perimeter or sides of the disc. However, an advantage of placing markings on the flat side of the disc is that this side of the disc is in contact with the culture rope. This shelters the marked side of the disc, preventing detritus or organisms such as barnacles or tube worms from building up and obscuring the markings.

The rotational movement of the disc, as it moves according to the prevailing tidal conditions, also causes an abrasion effect upon the marked side on the disc, helping to keep it clean and thus the markings legible.

In some embodiments of the present invention, the flat surface of the disc may be treated with an anti-fouling agent. This also minimises or prevents algal growth which would potentially obscure the markings on the disc.

In use, oyster spats are secured to the concave portion of the base using a water proof adhesive. A fast setting UV curing adhesive, such as a thixotropic epoxy resin or cyanoacrylate adhesive, is preferred to ease the mechanization of the oyster cultivation process, although persons skilled in the art will appreciate that other suitable adhesives may be used.

Adhesive is applied to one side of the oyster shell and the oyster spat is placed within the concave portion of the base. Alternatively, the adhesive may be applied to the base itself, before placement of oyster spat.

In some embodiments of the present invention, a cement-like material may be applied to the shell of the oyster spat to act as a coating agent prior to placement of the spat to the base. The coating agent may applied using a spray means, or alternatively, the oyster spat may be immersed in a solution containing the coating agent. The coating agent increases the texture of the shell, and assists in the bonding of the oyster spat to the base.

Preferably, the oyster spat has been centrally located within the recess of the base and secured using adhesive. The edges of the oyster spat overhang the base. This prevents adhesive from coming into contact with the hinge of the shell of the oyster spat, or from covering and bonding the lips of the shelve halves together.

Preferably, the oyster spat is approximately 15 to 30 mm across at the time of securing the spat to the base. The shell of the oyster spat is much more defined at this size allowing for better placement of the spat. However, persons skilled in the art will appreciate smaller or larger sized oyster spats may also be used.

Preferably, the diameter of the base is approximately 10 to 20 mm. This size is preferred to ensure that the base is smaller or at least the same size as the oyster spat to which it is to be secured. However, persons skilled in the art will appreciate that the size of the base may vary according to the shellfish species being cultivated.

The shells of all shellfish grow away from the hinge of the shell. Initially, the present invention will be secured approximately central on the oyster spat shell. This also places the point of attachment (axis of rotation) of the base to the culture rope central relative to the oyster. However, as the oyster grows, the axis of rotation will gradually favour the hinge.

This is important, as this placement ensures that the hinge always faces towards the sea surface, while the feeding organs face the sea bed, and thus are placed out of the direct path of detritus or sediment falling from the water surface through the water column. This gives the shellfish optimal conditions for filter feeding.

As the oyster spat grows, its hinge will stay fixed relative to the base, while the opposing end of the oyster shell will lengthen. As the oyster grows, the resulting increase in oyster mass will cause the centre of mass of the oyster spat to move away from the hinge and the axis of rotation of the base. This will help ensure that the hinge remains substantially facing the water surface.

Following the placement of the oyster spat to the base, the base is attached to the culture rope via the pin arising from the flat side of the disc.

Alternatively, the base is attached to the culture rope before placement of the oyster spats on the base.

This process is repeated for the next oyster spat, ensuring the separation of the base from its neighbouring base is approximately equal. This process is relatively straightforward to mechanise, which will reduce the labour costs of establishing the shellfish aquaculture farm.

This also reduces competitive stress on the oyster, as it is not competing with other oysters for food and resources.

When the culture rope has been deployed in the water column, the prevailing current causes a slight rotation of the base relative to the culture rope. Therefore, the prevailing current will cause the base to rotate in such a manner that the oyster spat, when feeding, faces downstream of the prevailing current.

It is important to note that it is irrelevant how the base and its attached oyster spat is initially orientated when it is fixed to the culture rope. Once the culture rope is immersed in the water, the oysters will automatically re-orientate themselves to an optimal position for feeding and growth.

This is with the hinge of the oyster approximately facing the water surface, and the open portion of the shell and its feeding organs approximately facing the sea bed. The degree to which the hinge faces the water surface can vary according to the strength of the prevailing current. Orientating the oyster in this way minimises the amount of sediment or detritus which enters the feeding organs of the oyster. This reduces the stress upon the oyster, and ultimately results in improved oyster growth.

A further advantage of permitting rotation of the disc relative to the culture rope is the constant abrasion of the underside of the disc, which may bear markings and information relating to the oyster, against the rope helps prevent algal growth or detritus otherwise forming on the underside of the disc. This helps ensure that the markings on the disc remain legible.

This method of oyster cultivation also reduces disease and parasitic infestation by mud worms or flatworms, by reducing the exposure of oysters to these organisms.

This method of oyster cultivation, because it comprises only two components, the base and the culture rope, maximises water flow around the growing oyster. The reduction in components also results in less surface area, relative to shellfish conventional apparatus, which will attract fouling.

The present invention, unlike the prior art, allows for greater automation of the oyster cultivation and harvesting process. Oysters grown to maturity using the present invention can be harvested by simply shearing off the pin from its base. Automation of the collection of the cultivated shellfish greatly reduces the costs involved in the harvesting of oysters.

As the culture rope is retrieved, an automated machine cuts or breaks through the pin where it meets the base, separating the oyster, along with the base, from the pin and its barb, and the culture rope.

Alternatively, the entire culture rope is collected, and transported back to a processing facility for removal of the oyster and its attached base from the culture rope. This method is preferred when the culture rope has been suspended on a frame.

It will be appreciated that the present invention takes up considerably less space than conventional shellfish aquaculture methods. This means smaller vessels can be used for establishing and maintaining the oyster farm and when retrieving the culture rope.

The markings on the underside of the base acts as an advertising medium to the consumer, by stating the place of origin of the oyster, and directing the consumer towards a website specific to the grower of the oyster. In this manner, the consumer, or other interested parties such as the distributor or retailer, can retrieve information from the website relating to the oyster being consumed, such as place and dates of cultivation.

These markings also provide a means of tracing oyster product in the event of a product recall. An added advantage of allowing product traceability is to allow easier detection of situations whereby lower quality seafood products are repacked under a different, but prestigious, brand name.

Therefore, it can be appreciated that the present invention offers a number of advantages over the prior art:

Allows cultivation of individual oysters that are optimally placed to reduce overcrowding and competition stress and freely suspended in the water column.

Allows the oyster to self-orientate itself according to the prevailing current conditions for optimal feeding and growth.

Optimises the quality of feeding for each individually cultivated oyster, which results in a higher quality seafood.

Reduces stress from competition and overcrowding, which also results in a higher quality seafood.

Can be used in sub-tidal and inter-tidal conditions.

Takes up little space relative to conventional shellfish aquaculture apparatus.

Is easy to manufacture, with minimal components, which reduces the capital outlay when establishing an oyster farm.

Allows a high degree of mechanisation of the establishment of an oyster farm and the harvesting of mature oysters, which greatly reduces labour costs for the farmer.

Improves traceability of individual oysters in the event of a product recall for food safety reasons.

Provides a unique web-based marketing tool for the oyster cultivation industry by using reference numbers on the base which can be entered into a website to retrieve information relating to the oyster.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
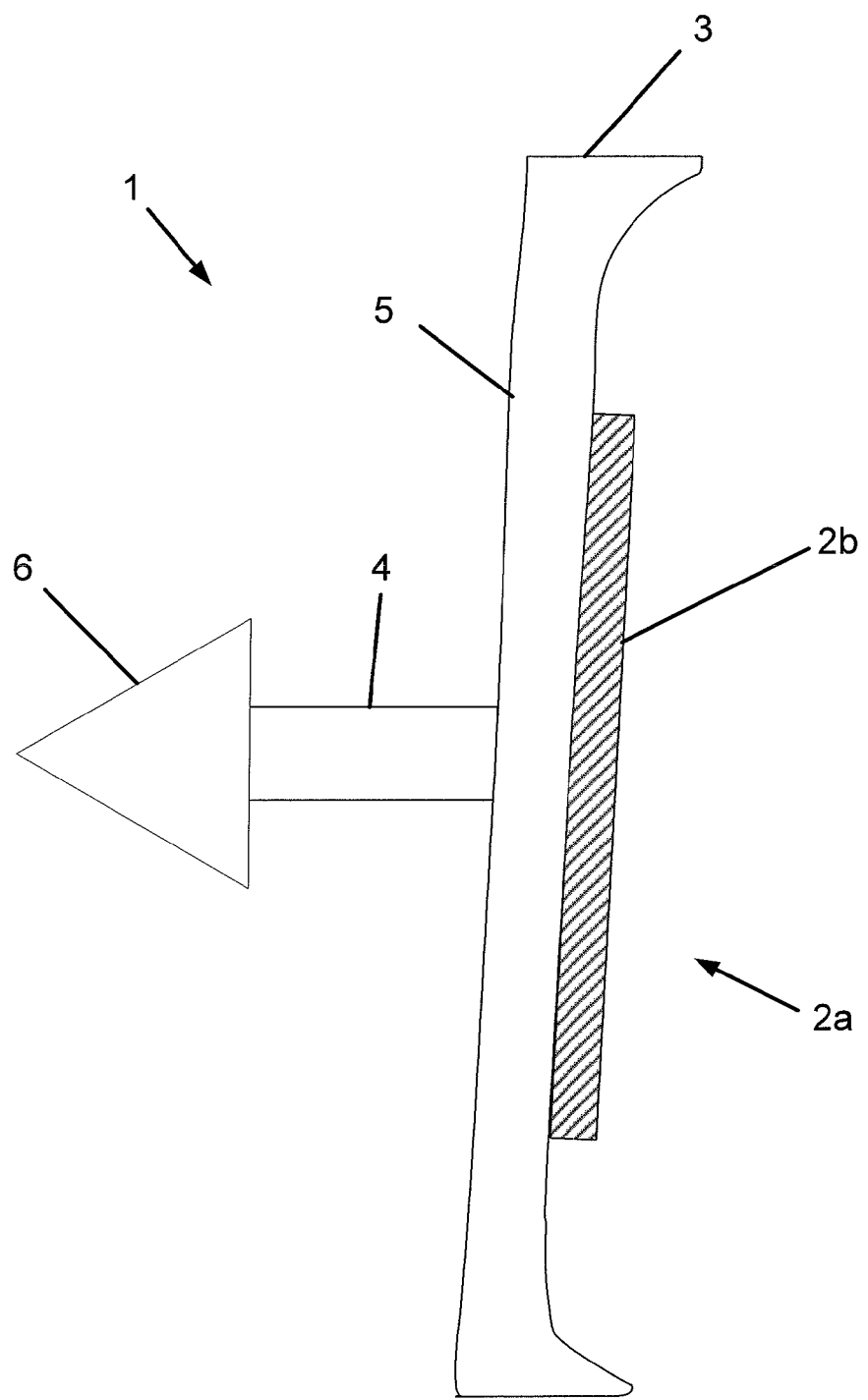
FIG. 1 shows a side view of the present invention.

With reference to the drawings there is provided an apparatus for the cultivation of shellfish (generally indicated by arrow 1). An oyster spat (not shown) can be secured to the concave portion (2*a*) of the base (3). The concave portion (2*a*) may optionally include a sponge like medium (2*b*) such as rubber or fabric mesh which assists in the securing of the oyster spat to the disc.

A pin (4) arises from the underside (5) of the base (3). At the tip of the pin (4), a conical barb (6) is provided. The barb (6) is forced through the weave of a culture rope (not shown) to fix the base (3) in position on the culture rope (not shown).

The distance between the underside (5) of the base (3) and the widest portion of the barb (6) closely approximates the thickness of the culture rope (not shown) to which the present invention (1) is fixed.

However, it should be appreciated that once the base (3) is placed on the culture rope (not shown), that the mounting of the base (3) to the culture rope (not shown) is loose enough to permit rotational movement of the base (3).

Figure 2:
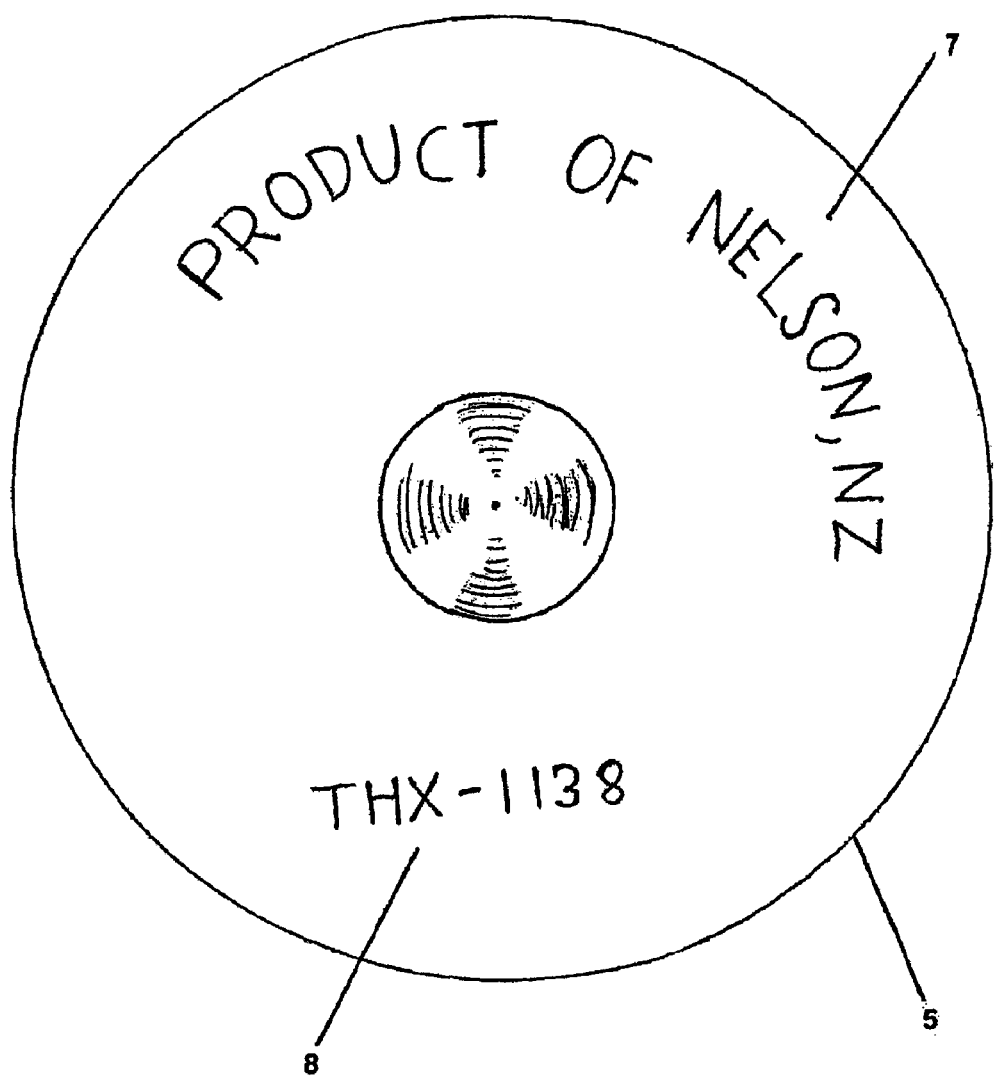
FIG. 2 shows a plan view of the underside of the present invention.

FIG. 2 illustrates the underside of the base (5) in plan view.

The base has been injection moulded in plastic, the mould forming markings (7) to indicate the origin of the oyster (not shown). Other markings (8) indicate the batch number of the oyster (not shown).

The batch number (8) may be entered into the farmer's website (not shown) to retrieve information (not shown) relevant to the cultivation of the oyster (not shown).

Figure 3:
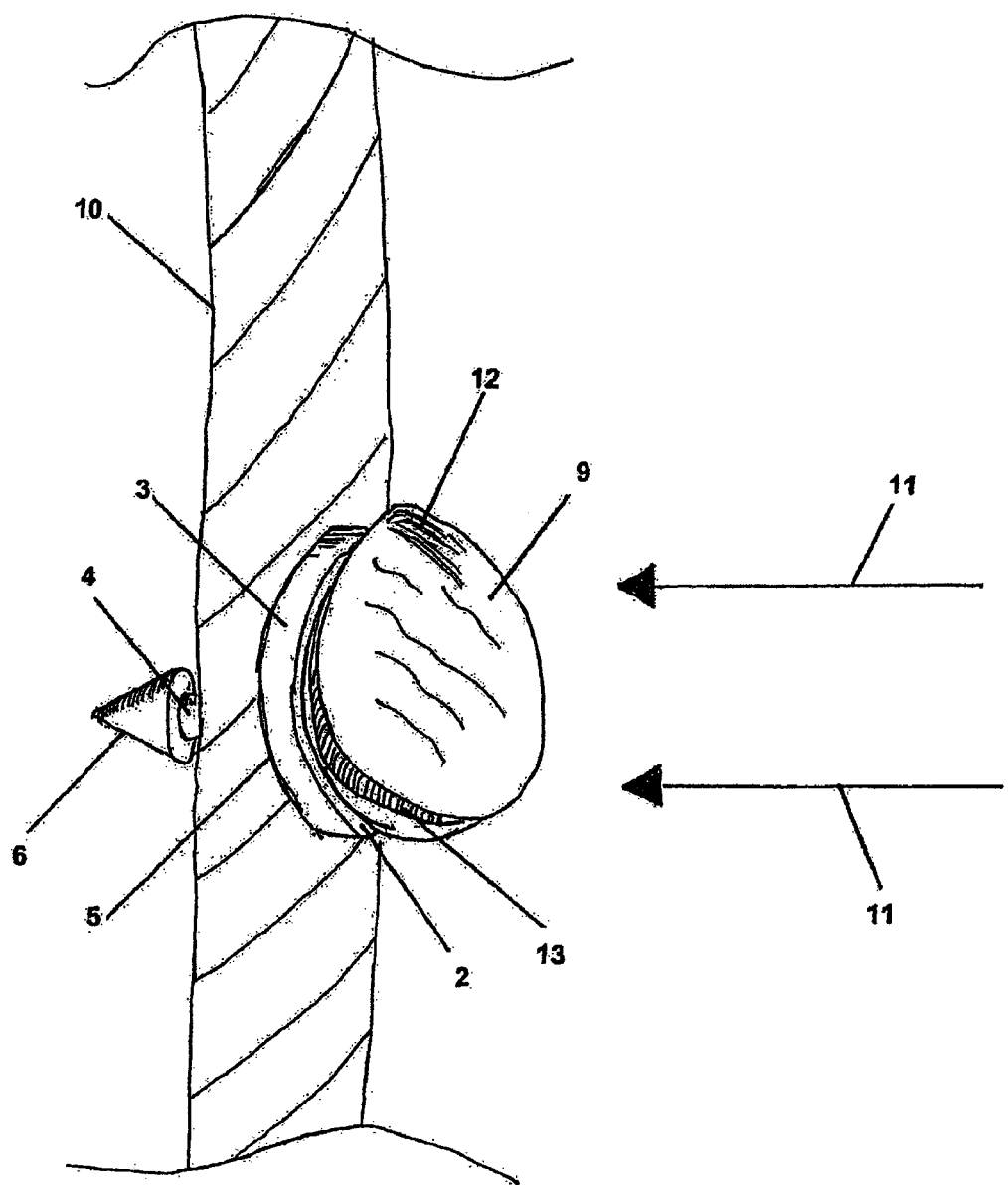
FIG. 3 shows a perspective view of the present invention with oyster spat attached.

FIG. 3 demonstrates the present invention in use.

An oyster spat (9) has been secured to the concave portion (2) of the base (3). It should be appreciated that the spat (9) is a little larger than the base (3).

In turn, the base (3) has been secured to the culture rope (10) by forcing the barb (6) through the weave of the culture rope.

The pin (4) is only slightly longer than the thickness of the culture rope (10), to ensure a relatively snug fit.

The pin (4) is circular in cross-section, to minimise the effect of friction from the culture rope (10) as the base (3) rotates relative to the culture rope (10).

The current (indicated by arrows 11) causes rotation of the base (3) such that the hinge (12) of the oyster (6) faces upstream of the current (11), while the feeding organs (13) of the oyster (6) faces downstream of the current (11).

This places the feeding organs (13) of the oyster (6) out of the direct path of the prevailing current (11).

Figure 4:
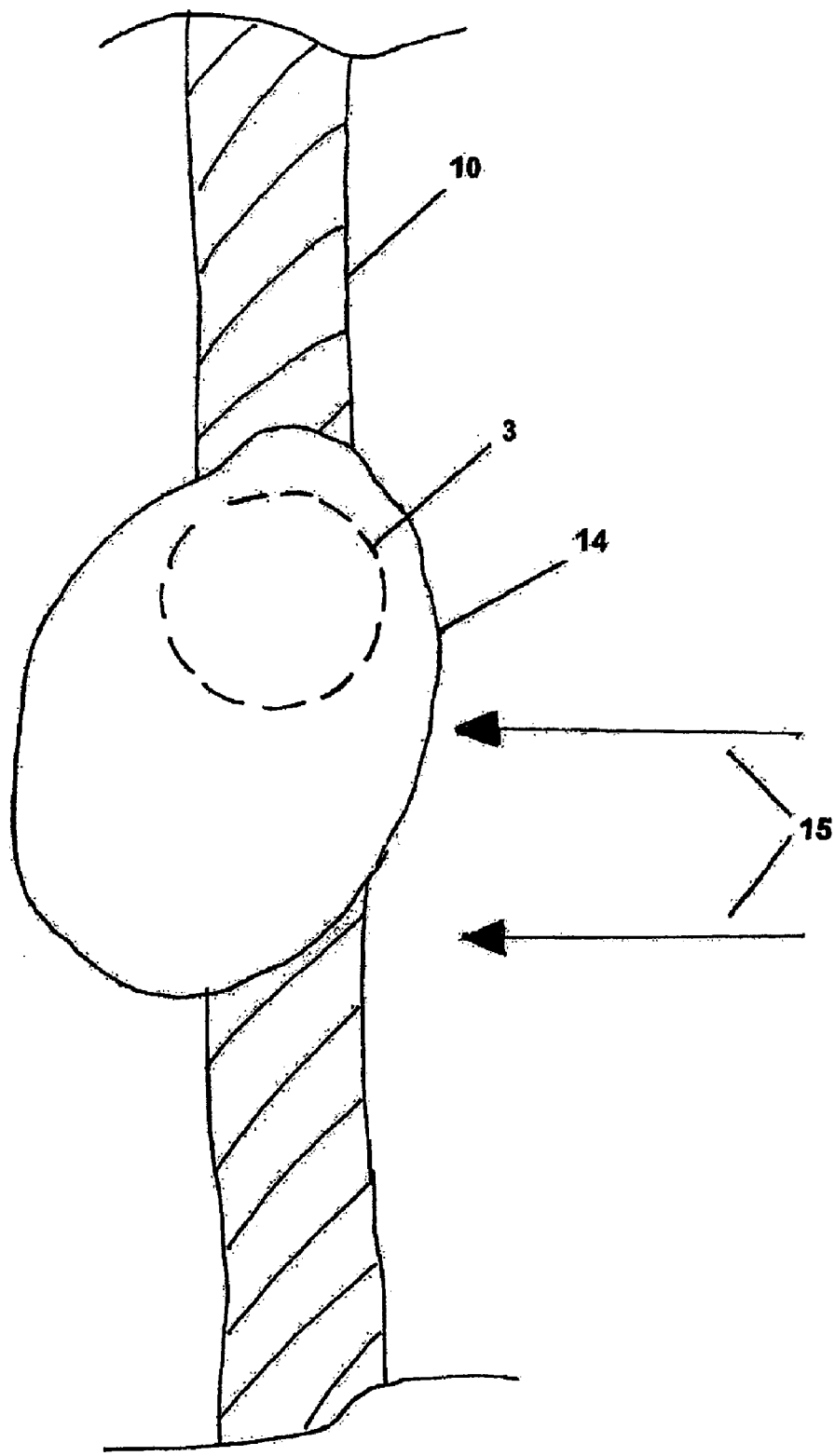
FIG. 4 shows a front view of the present invention with mature oyster attached.

FIG. 4 shows a mature oyster (14) being cultivated on the culture rope (10). It has grown considerably, such that it is now much larger than the base (represented by dashed lines 3).

The direction of the prevailing current is indicated by arrows 15. This causes the oyster (14) to orientate itself such that the open portion of the shell (not shown) faces away from the current (15).

Figure 5:
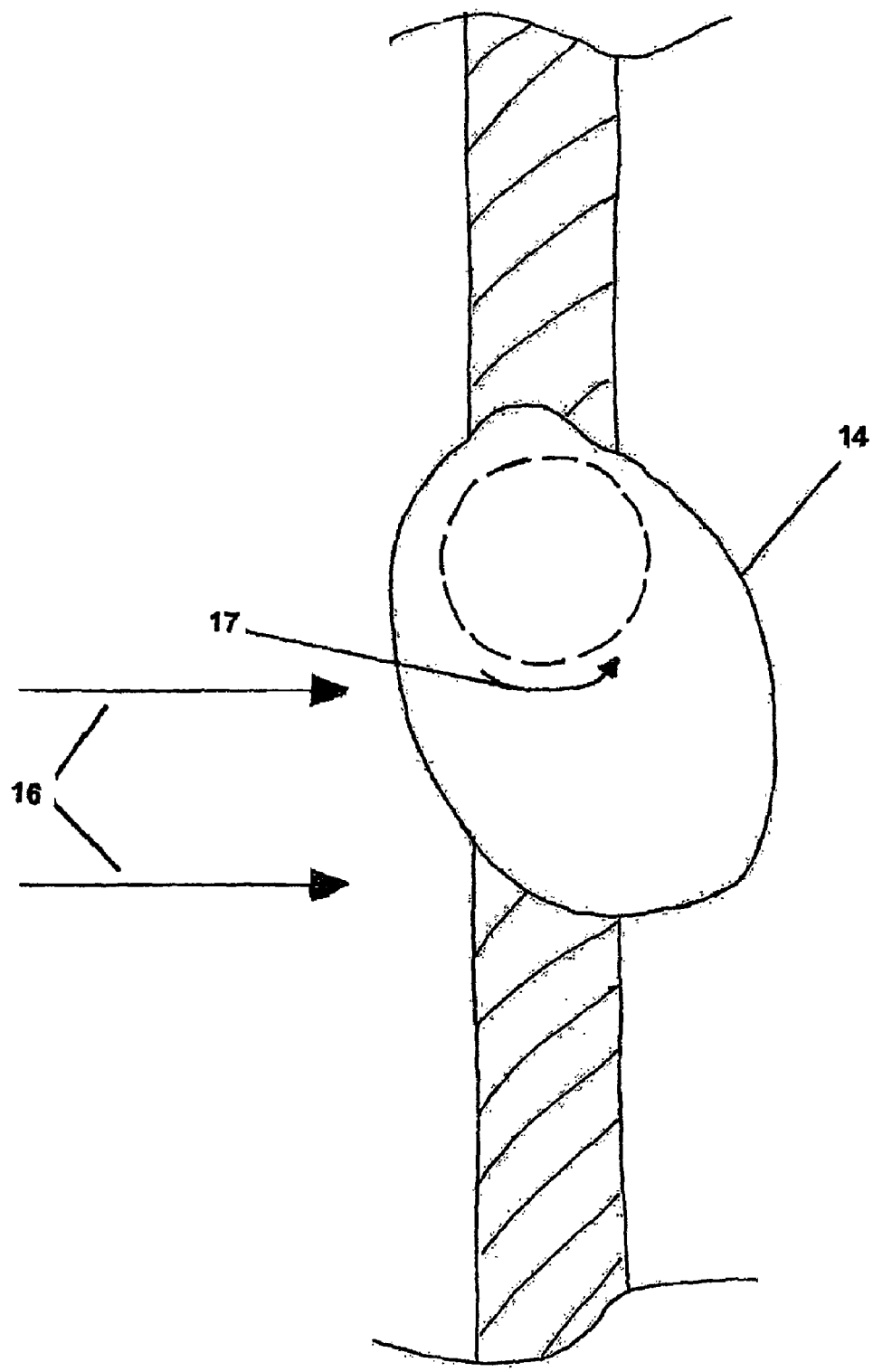
FIG. 5 shows a further front view of the present invention with mature oyster attached.

In FIG. 5, the direction of the prevailing current (16) has now changed. This causes rotation of the base (3) in the direction indicated by arrow 17.

This keeps the open portion (not shown) of the oyster (14) in an optimum position for filter feeding, which is away from the direction of the current (16).

Figure 6:
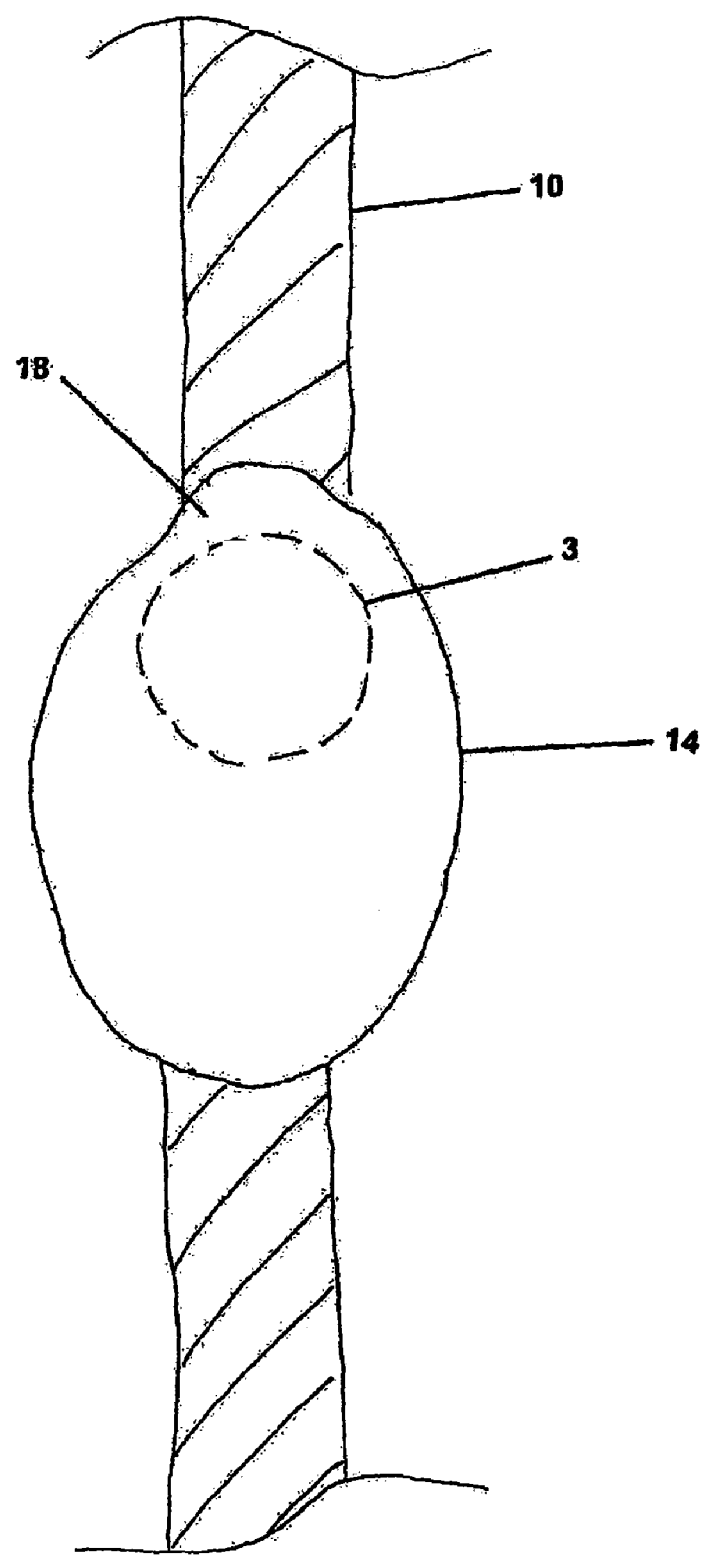
FIG. 6 shows a further front view of the present invention with mature oyster attached.

In FIG. 6, there is no prevailing current. The oyster (14) now hangs substantially vertical on the culture rope (10). The hinge (18) of the oyster (14) faces the water surface (not shown).

Aspects of the present invention have been described by way of example only and it should be appreciated that modifications and additions may be made thereto without departing from the scope thereof as defined in the appended claims.

What I claim is:

1. An apparatus for cultivation of shellfish, the apparatus including:
   a base with a culture surface, and
   a support attachment for the base, wherein the support attachment is a pin arising from the base, the pin having a circular cross-section and wherein the pin is configured with a barbed point, the barbed point having a conical shape,
   wherein the support attachment is configured to permit rotational movement of the base of the apparatus relative to a support in situ, wherein the base of the apparatus is a disc, the disc being substantially concave on a first side of the disc to form a recess, and flat on an opposing side, wherein the disc is secured to the support such that the shellfish can self-orientate, and wherein the barbed point includes a base which is substantially circular in cross-section, the base of the barbed point being configured to at least partially contact the support when the base of the apparatus is secured to the support.

2. The apparatus as claimed in claim 1 wherein the culture surface is configured to support a single shellfish.

3. The apparatus as claimed in claim 1 wherein the recess is the culture surface.

4. The apparatus as claimed in claim 1 wherein the recess includes a sponge-like medium.

5. The apparatus as claimed in claim 4 wherein the sponge-like medium is rubber or fabric mesh weave.

6. The apparatus as claimed in claim 1 wherein the flat side of the disc is used as a surface for carrying markings indicating information pertaining to an origin of the shellfish.

7. The apparatus as claimed in claim 6 wherein the markings give reference to a website specific to a farmer or grower of the shellfish.

8. The apparatus as claimed in claim 7 wherein the markings include a reference number.

9. The apparatus as claimed in claim 6 wherein the markings are formed in situ.

10. The apparatus as claimed in claim 6 wherein the markings are adhesive labels.

11. The apparatus as claimed in claim 6 wherein the markings are printed directly onto the disc.

12. The apparatus as claimed in claim 6 wherein the markings are engraved.

13. The apparatus as claimed in claim 6 wherein the markings are heat branded.

14. The apparatus as claimed in claim 1 wherein the flat side of the disc is treated with an anti-fouling agent.

15. The apparatus as claimed in claim 1 wherein a first portion of the pin where it meets the base of the apparatus has a reduced diameter relative to a second portion of the pin.

16. The apparatus as claimed in claim 1 wherein a tip of the pin is heat treated to form the barbed point.

17. The apparatus as claimed in claim 1 wherein a diameter of the base of the apparatus is less than a diameter of the shellfish to be placed on the base of the apparatus.

18. The apparatus as claimed in claim 17 wherein the diameter of the base of the apparatus is approximately 10 to 20 millimeters.

19. The apparatus as claimed in claim 1 wherein the shellfish is an oyster.

20. The apparatus as claimed in claim 19 wherein the oyster is a spat.

21. The apparatus as claimed in claim 1 wherein at least the base of the apparatus is constructed from plastics material.

22. The apparatus as claimed in claim 21 wherein the plastics material is at least partially transparent.

23. A method of cultivating shellfish using an apparatus as claimed in claim 1, the method including the steps of:
   a) securing a shellfish to a base of the apparatus;
   b) securing the base of the apparatus to a support; and
   c) securing the base of the apparatus to the support such that the base of the apparatus rotates relative to the support when in situ such that the shellfish can self-orientate.

24. The method of cultivating shellfish as claimed in claim 23 which includes the additional step of:
   d) placing a sponge-like medium between the shellfish and the base of the apparatus.

25. The method of cultivating shellfish as claimed in claim 23 which includes the additional step of:
   e) marking the base of the apparatus to indicate information relating to the shellfish.

26. The method of cultivating shellfish as claimed in claim 23 wherein the shellfish is an oyster.

27. The method of cultivating shellfish as claimed in claim 26 wherein the oyster is a spat.

28. The method of cultivating shellfish as claimed in claim 27 wherein the oyster is a spat measuring approximately 15 to 30 millimeters across at a time of securing the spat to the base of the apparatus.

\* \* \* \* \*